Aug. 3, 1965 T. W. DRIESCH ETAL 3,198,308
CONVEYOR SNATCHER
Filed May 24, 1962 3 Sheets-Sheet 1

DIVERTER CONTROL

INVENTOR
THEODORE W. DRIESCH
WILLIAM H. WOOD

BY John B. Sponsler

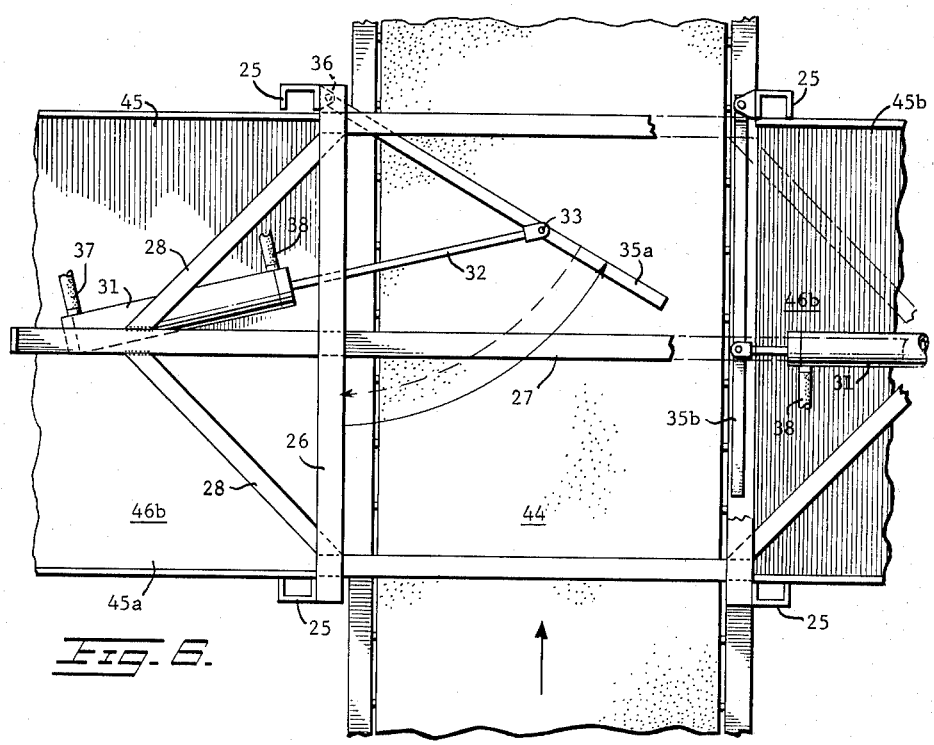
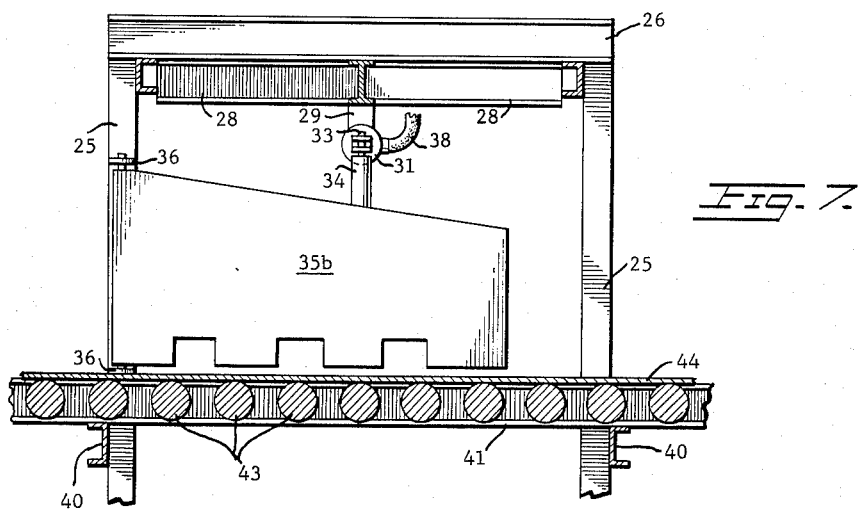

United States Patent Office 3,198,308
Patented Aug. 3, 1965

3,198,308
CONVEYOR SNATCHER
Theodore W. Driesch and William H. Wood, Roanoke, Va., assignors to General Electric Company, a corporation of New York
Filed May 24, 1962, Ser. No. 197,406
7 Claims. (Cl. 198—24)

This invention relates to materials handling systems and the like, and, more particularly, to mechanism for removing or transferring objects and materials from conveyor belts.

Normally conveyor apparatus includes arrangements of endless belts that are power driven continuously whereby objects or materials placed upon the belts are transferred from one location to another selectively. This type of apparatus finds utility in warehouses, freight handling systems, mail bag distribution and similar activities wherein the bulk or weight, or both, provides serious obstacles to manual handling not only in respect to feasibility, but also as to time consumed. Frequently, large quantities of objects or materials are required to be rapidly transferred or distributed from a central location to many somewhat remote destinations; consequently, it becomes economically important to accomplish such distribution with a minimum of delay and without undue accumulation of materials and objects to be distributed.

It is conventional practice to make distribution by loading objects upon conveyor belts, manually or otherwise, the objects being placed at selected intervals upon the belts, and thereafter being removed or unloaded at their final destinations by deflectors, which divert the objects from the conveyor belts under the force of movement of the belt, or by pushers, which mechanically traverse the conveyor belts at the unloading destinations thereby displacing objects from the belts. However, both of these methods of unloading conveyor belts have certain disadvantages tending to slow down the removal of objects from the belt, to bring about jams and faulty unloading, and to damage the objects being handled. Some of these deficiencies may be overcome by loading the conveyor belts to have greater intervals between successive objects; however, this results in reducing the rate of carrying capacity of the system.

The present invention is directed to a novel arrangement for unloading objects from conveyor belts by means of a powered diverter or snatcher, taking advantage of the inherent desirable properties of the deflector and pusher arrangements and discarding their undesirable characteristics.

It is therefore an object of this invention to provide an improved means for unloading objects or materials from a moving conveyor belt.

It is another object of the invention to provide an improved conveyor belt unloader wherein a vane or diverter element is interposed in the conveyor belt path to partially arrest the motion of an object and to eject the object when the diverter element returns to its home position.

It is still another object of the invention to provide unloading mechanism for a moving conveyor belt wherein articles are snatched from the belt by the swinging action of an interposer element.

The invention is set forth with particularity in the appended claims. The principles and characteristics of the invention, as well as other objects and advantages are revealed and discussed through the medium of the illustrative embodiments appearing in the specification and drawings which follow.

In the drawings:

FIGURE 6 is a plan view of FIGURE 5 with certain portions deleted.

FIGURE 7 is a sectionalized view along the lines 7—7 of FIGURE 6.

Figure 1:
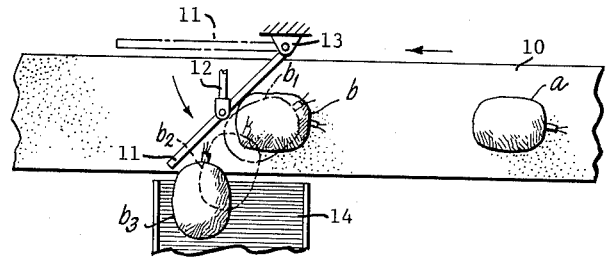
FIGURE 1 is a diagrammatic view of the normal manner in which objects are removed from a conveyor belt by deflector devices.

Referring to FIGURE 1 a conveyor belt 10 moving from right to left is shown provided with articles or objects $a$ and $b$, which as shown in the drawing are represented to be mailbags. Along the path of the conveyor belt 10 there is located a deflector element 11 pivoted at a point 13 to swing out over the belt 10, the normal position of the element 11 being parallel with the belt 10 (see dot-dash lines). When it is desired to remove or discharge a mailbag $b$ from the belt 10, the element 11 is moved across the belt by a push rod 12 so that it makes an angle of approximately thirty degrees with its normal inoperative position. As a result the mailbag $b$ is deflected unto a platform 14 due to the motion of the belt 10, and the mailbag assumes the positions $b_1$, $b_2$ and $b_3$ during its course of removal. Since the force removing the mailbag $b$ unto the platform 14 is dependent upon the frictional properties of the belt 10, the element 11, and the material of which the mailbag $b$ is made, as well as upon the angle of the element 11, the exact period of removal is somewhat uncertain since these characteristics may vary as a result of wear, dust or dirt, etcetera, and another article on the conveyor belt 10, such as a mailbag $a$ following the mailbag $b$, may be unintentially deflected unto platform 14 unless the interval between articles on the belt is made very great. Jams or interference between successive articles upon the conveyor belt 10 may also result unless the interval is very great. Since the efficiency of a conveyor is a direct function of the number of items delivered per unit of time, increasing the interval between articles upon the belt is undesirable, and the most sought for belt interval is one that provides no more than a minimum clearance between each article upon the belt.

Figure 2:
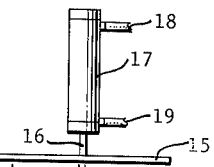
FIGURE 2 is a diagrammatic view of the normal manner in which objects are removed from a conveyor belt by pusher type devices.

An arrangement that overcomes the objectionable features, noted immediately above, is illustrated in FIGURE 2, which shows articles $a$ and $b$ upon the belt 10 moving from right to left. When it is desired to remove the article $b$, for example, a pusher 15 supported by a piston rod 16, driven by a piston reciprocating in an air-actuated cylinder 17 via the air inlet/outlets 18 and 19, moves across the belt 10 (to the position indicated by the dash dot lines) and pushes the article $b$ unto the platform 14. With this arrangement, since the air-actuated piston moves very rapidly, there is little variation in the operation due to frictional wear, et cetera; however, the pusher 15 strikes the article (such as mailbag $b$) with high velocity, and fragile items may be damaged or destroyed.

Figure 3:
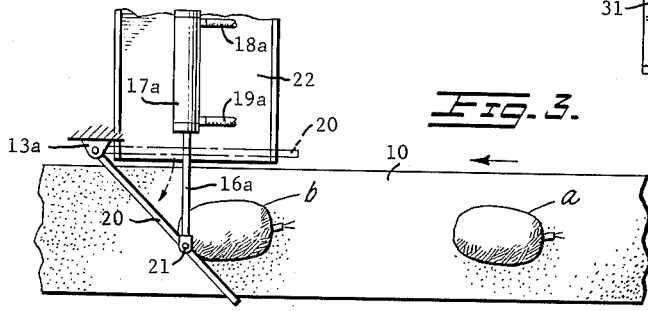
FIGURE 3 and FIGURE 4 represent diagrammatic views illustrating the unique manner in which objects are snatched from a conveyor belt according to the concepts of the present invention.

The operation of the present invention is best illustrated by reference to FIGURES 3 and 4. In FIGURE 3, for example, mailbags $a$ and $b$ are shown upon a conveyor belt 10 moving from right to left. Let it be presumed that mailbag $b$ is to be discharged from the conveyor belt unto a platform 22. At a time just prior to the arrival of the mailbag *b* opposite the platform 22, a diverter 20 pivoted at 13*a* is swung across the belt 10 by a piston rod 16*a* attached to the diverter 20 by a pin 21. The piston rod 16*a* may be actuated by an attached piston in a cylinder 17*a* having air inlet/outlets 18*a* and 19*a* operating in such a manner that air introduced under pressure at inlet 18*a* and exhausted at outlet 19*a* will cause the diverter 20 to move from its initial position (dash dot lines) to its extended position (solid lines) making an angle of more than 30 degrees with its normal home position.

Figure 4:
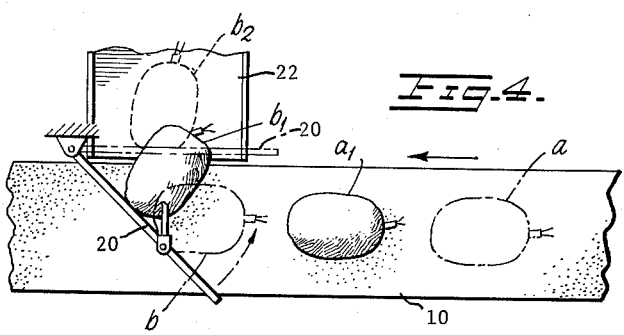

As the mailbag *b* encounters the extended diverter 20 since the conveyor belt 10 is moving continuously, momentarily the travel of the mailbag *b* is arrested resulting in a turning of the mailbag as indicated at $b_1$ in FIGURE 4. A fraction of a second later the flow of air to inlet/outlets 18*a* and 19*a* is reversed (by a multi-port valve not shown) thereby causing the diverter 20 to return to its normal home position and sweeping the mailbag *b* onto the platform 22, as indicated at $b_2$ in FIGURE 4, at the same time providing clearance for the following mailbag *a* immediately following mailbag *b*, as indicated at $a_1$ in FIGURE 4. Although the parameters for the operation just described may be varied, actual operation has been successfully accomplished with a belt speed of 360 feet per minute using a six foot platform width (platform 22), six foot intervals between articles being conveyed upon the belt (belt 10) and using a diverter speed (diverter 20) of one complete cycle (diverter to operation position and return) per second. In other words articles have been successfully snatched from the moving conveyor belt at the rate of one article per second without interfering with successive articles following the article being "snatched." The diverter control unit to actuate the diverter repetitively, as illustrated above, may be of any known type, such as that disclosed in the aforementioned U.S. Patent 3,181,713 which issued May 4, 1965, under the title "Discharge of Mail Bags."

It is a feature of the present invention, therefore, to provide a conveyor unloading device for rapid removal of articles from a conveyor belt of high density loading without interference with subsequent articles on the conveyor belt.

Figure 5:
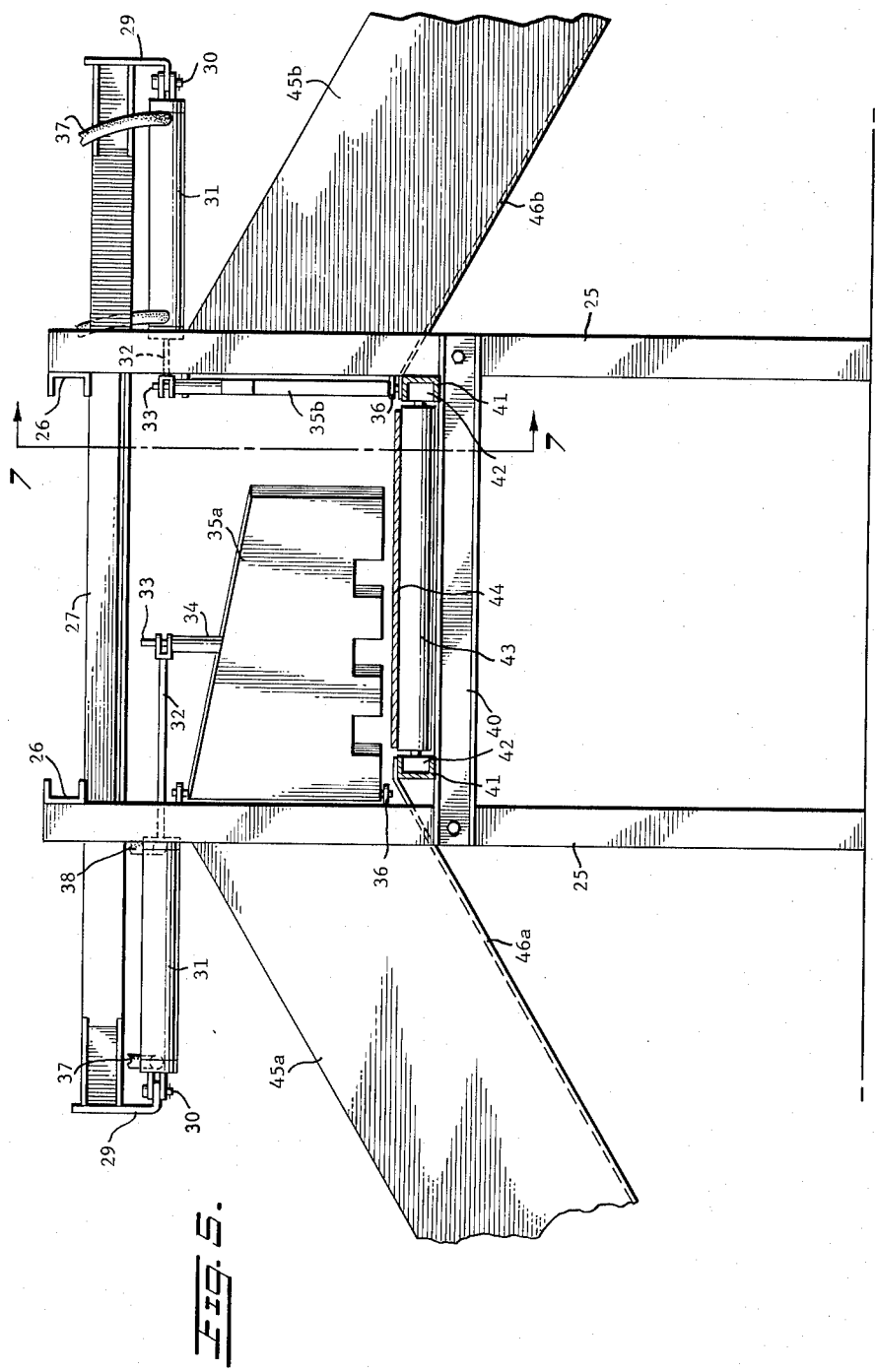
FIGURE 5 is a front elevation view of an embodiment of the present invention illustrating an unloading station for a belt type conveyor having a plurality of unloading stations as in U.S. Patent 3,181,713 which issued May 4, 1965, assigned to the assignee of the present application.

Referring now to FIGURE 5 an embodiment is illustrated showing one form of construction of conveyor belt unloader that has operated successfully as pointed out above. In the drawing of FIGURE 5 a two position unloaded is shown, providing "snatching" of articles from a conveyor belt in either of two directions. In general the arrangement of FIGURE 5 follows along the lines discussed above in regard to FIGURES 3 and 4, the unloading apparatus being carried by a framework having four vertical columns 25, cross members 26 and a supporting bar 27 at the top of the structure having angle braces cylinder 17*a* of FIGURE 3. A diverter is mounted upon located fixtures 29 to which operating cylinders 31 are pivotally mounted by bolts 30, the operating cylinders 31 corresponding to the cylinder 17 of FIGURE 2 or the cylinder 17*a* of FIGURE 3. As diverter is mounted upon each side of the structure, as viewed in FIGURE 5, being supported by bearing brackets 36 carried by the columns 25, diverter 35*a* being shown on the left side and diverter 35*b* being shown on the right side, in such a manner as to swing out over a conveyor belt 44 which the diverter supporting structure straddles. Each diverter carries pins which engage with the brackets 36 for permitting the diverters to pivot as indicated above. Each diverter (35*a* and 35*b*) also is provided with an operating stud 34 attached near the top center of the diverter, the stud 34 having a pin 33 which is engaged by a yoke on the end of a piston rod 32, the piston rod being attached to a piston (not shown) within the cylinder 31. Diverter swing depends upon piston travel.

Figure 2A:
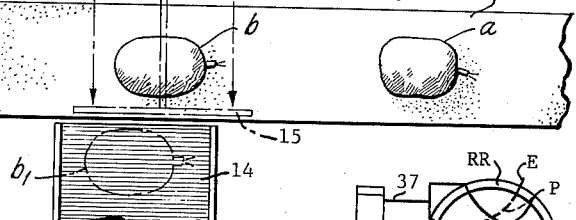
FIGURE 2A is a diagram of a valve control.
Figure 2A:
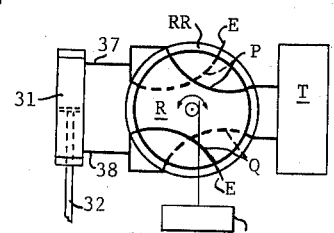

The cylinder 31 is provided with two ports 37 and 38, respectively, and it operates to move the piston rod 32 in accordance with air pressure, or the lack of air pressure, supplied to these ports. For example, when air pressure is supplied to port 37 and not to port 38, the piston rod 32 moves out from the cylinder 31; and when the opposite pressure conditions are applied, the piston rod 32 moves in toward the cylinder 31. Although no part of this invention, a valve is illustrated in FIGURE 2A that demonstrates the manner in which the cylinder 31 and piston rod 32 are controlled. In this figure a rotor R is arranged to rotate in a valve body RR having 8 ports, two of these ports E being open to the atmosphere. As indicated two other ports are connected to a tank T containing air above atmospheric pressure. Two other adjacent ports are connected to the port 37 of the cylinder 31, and the remaining two adjacent ports of the body RR are connected to the port 38 of the cylinder 31. The rotor R is provided with passages P and Q, which, as the rotor R is turned, form passages among the several ports of the valve body. When the rotor is turned as shown in the figure, high pressure air will flow from the tank T through the passage P to the port 37 of cylinder 31, and air will be exhausted from port 38 of cylinder 31 through passage Q to an exhaust port E, thereby causing the piston rod 32 to move out from the cylinder 31. When the rotor R is turned so that the passages P and Q assume the pattern represented by the dotted lines in FIGURE 2A, the port 38 receives air under pressure and the port 37 exhausts so that the piston rod 32 moves in toward the cylinder 31. It is obvious that a similar arrangement can be employed with the cylinders 17 and 17*a*, respectively, of FIGURES 2 and 3. A similar operation of the cylinder 31 and its coacting piston rod 32 may be obtained with solenoid operated air valves arranged in the same manner.

Referring now to FIGURES 5, 6 and 7, the conveyor belt 44 is supported upon a series of rollers 43, each roller being journalled at its ends in bearings 42 carried by channels 41 which are supported by members 40 attached to the columns 25. The members 40, which form the principal support for the belt 44, and the brackets 36, which form the principal support for the diverters 35 (the belt 44 being partially supported on a flat plate at diverter position) are spaced so that there is a predetermined clearance from belt to diverters, for example, diverter 35*a* in FIGURE 5, and the belt 44. Additional clearance may be obtained by providing openings in the bottom of the diverters, as illustrated in diverter 35*a* of FIGURE 5 or in diverter 35*b* in FIGURE 7. These openings provide clearance for the locks or clamps which are attached to the pull strings of conventional U.S. mailbags, the locks frequently trailing the mailbag proper so that, as explained hereinafter, a mailbag may have been "snatched" from the conveyor belt by a diverter before the lock clears the discharge or unloading point.

Referring now particularly to FIGURES 5 and 6, there is arranged a diverter chute at each unloading or discharge station of the conveyor belt 44. For example, at the unloading station presided over by diverter 35*a* there is a chute 45*a* having a floor 46*a* supported upon the channel 41, and similarly at the unloading station of diverter 35*b* a chute 45*b* having a floor 46*b*. These chutes are provided with a minimum clearance from the edges of the conveyor belt 44 so that when objects are swept or "snatched" from the belt by the diverters, little or no interference will be encountered at the junctures of the chutes with the belt.

The operation of the apparatus illustrated in FIGURES 5, 6 and 7 is best understood from FIGURE 6. Let it be assumed that objects upon the conveyor belt 44 are travelling in a direction corresponding to that from the bottom to the top of the sheet of FIGURE 6 (see arrow). Normally the diverters 35*a* and 35*b* are retained in their respective "home" positions as shown by diverter 35*b* of FIGURE 6. When it is desired to unload an article or object from the conveyor belt 44 at the unloading station corresponding to chute 45a, the diverter 35a is swung out across the belt 44 from its "home" position (as indicated by the solid arrow) to a position making an angle of substantially 45 degrees with its "home" position. The timing of this movement of the diverter 35a is dependent upon the belt speed, the opening of the chute, and the separation of the articles upon the belt; however, in any instance the timing is set so that the object is momentarily arrested by the diverter 35a, as previously explained above in connection with FIGURES 3 and 4, and thereafter as the operation of the cylinder 31 and piston rod 32 reverses (as explained above), the object is "snatched" or swept from the belt 44 into the chute 45a as the diverter 35a returns to its "home" position (see dotted arrow). The operation of diverter 35b in respect to chute 45b is precisely the same.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

What is claimed is:

1. A mechanism for unloading a series of objects one at a time from a conveyor belt moving at a relatively high speed comprising: a movable diverter positioned along the path of movement of said belt, and means for moving said diverter repetitively into said path to first intercept each object and to momentarily arrest the continued movement of the object in said path, said means also withdrawing said diverter from said path to then remove each object so arrested from said belt independently of the other objects in the series of objects.

2. A mechanism for unloading a series of objects one at a time from a conveyor belt moving at a relatively high speed comprising: a movable diverter positioned along the path of travel of said belt, means for moving said diverter repetitively into said path to first intercept any object and to momentarily arrest the continued movement of the object in said path, said means also moving said diverter in a direction opposing the movement of the said belt for removing each object so arrested independently of the other objects in the series of objects.

3. A mechanism for removing a series of objects one at a time from a conveyor moving at a relatively high speed comprising a diverter positioned along the path of movement of an object on said conveyor, means for repetitively moving said diverter over said path, means for limiting the movement of said diverter to first intercept each object and to momentarily arrest the continued movement of the object on said conveyor, said moving means also reversing the movement of said diverter to remove each object so arrested from said conveyor independently of the other objects in the series of objects.

4. A mechanism for unloading a series of objects from a conveyor moving at a relatively high speed including a pivoted diverter, means for repetitively swinging said diverter across the path of travel of each of said objects on said conveyor, means for limiting the movement of said diverter to a position for first intercepting each object and momentarily arresting the continued movement of the object on said conveyor, said swinging means also reversing the motion of said diverter to sweep each object so arrested from the said conveyor independently of the other objects in the series of objects.

5. A mechanism for unloading a series of objects from a conveyor belt moving at a relatively high speed including a diverter pivoted away from the direction of movement of said belt, means for repetitively swinging said diverter a predetermined amount over said belt in the direction of movement of said belt, means for limiting the travel of said diverter to first intercept each object and to arrest the continued movement of the object on the conveyor belt, said swinging means also swinging said diverter in a direction opposite the movement of said belt for sweeping each object so arrested therefrom independently of the other objects in the series of objects.

6. A mechanism for unloading a series of objects from a moving conveyor belt including a diverter member, said member being pivoted at one end with its free end toward an object being conveyed by said belt, means for repetitively swinging said member over said belt to form an angle of more than 30 degrees with the edge of said belt to first intercept each object and to arrest the movement of the object on the conveyor belt, said means also reversely swinging said member to sweep each object so arrested from said belt independently of the other objects in the series of objects.

7. A mechanism for unloading a series of objects from a moving conveyor belt including a diverter member, said member being pivoted at one end with its free end toward an object being conveyed by said belt, means for repetitively swinging said member over said belt to form an angle of more than 30 degrees and less than 90 degrees with the edge of said belt to first intercept each object and to arrest the movement of the object on the conveyor belt, said means also reversely swinging said member to displace each object so arrested from said belt independently of the other objects in the series of objects.

References Cited by the Examiner
UNITED STATES PATENTS

| | | | |
|---|---|---|---|
| 630,453 | 8/99 | Fairbanks | 198—188 X |
| 2,896,264 | 5/58 | Holben | 198—38 |
| 2,922,645 | 1/60 | Hurlbut | 198—185 X |

SAMUEL F. COLEMAN, *Primary Examiner.*

WILLIAM B. LABORDE, ROBERT B. REEVES,
*Examiners.*